Jan. 17, 1939. J. T. BYRNE 2,143,841
APPARATUS FOR HEATING LIQUID
Filed June 19, 1935
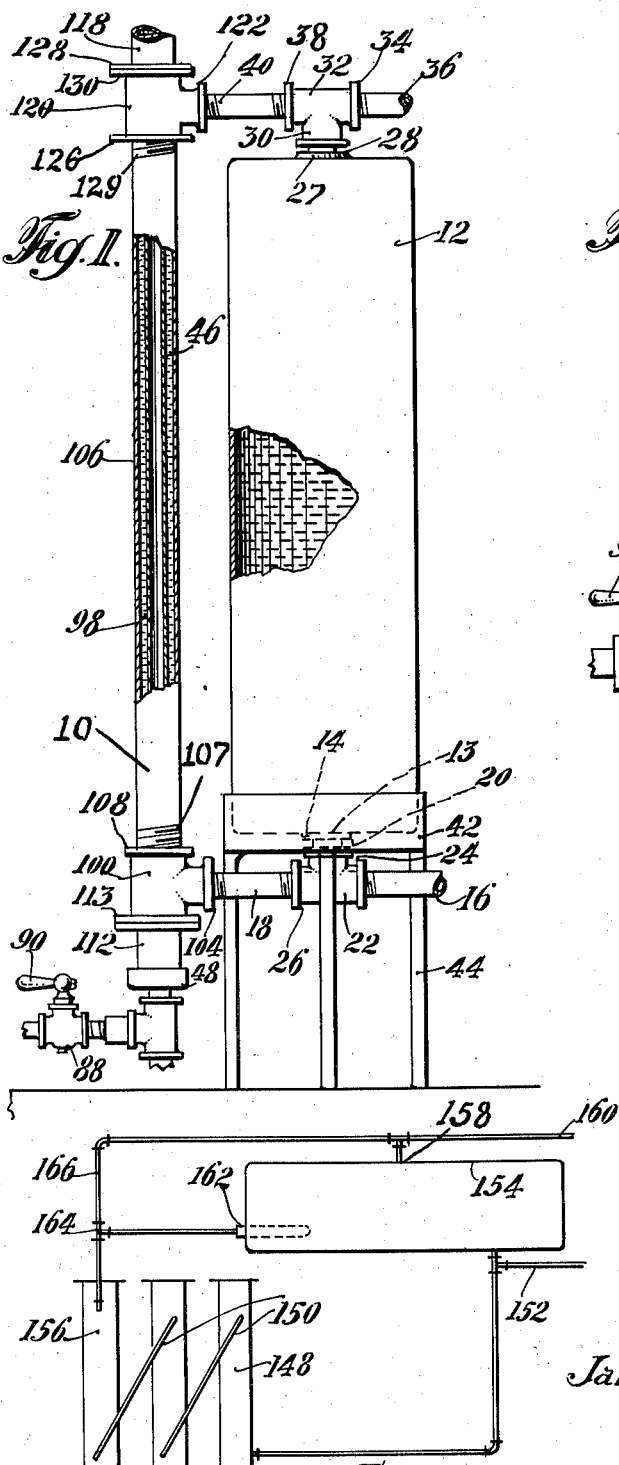
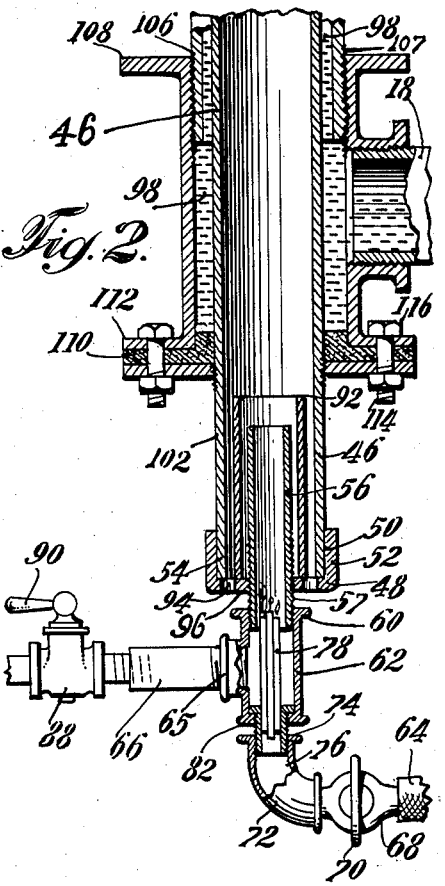
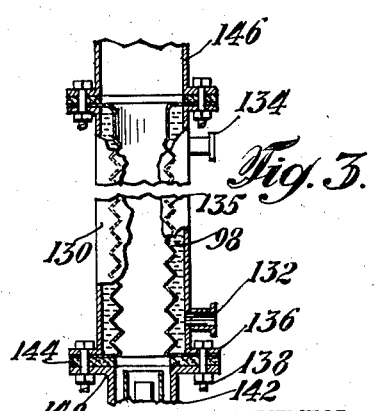
INVENTOR.
James Thomas BYRNE
BY *Irving F. Goodfriend*
ATTORNEY.

Patented Jan. 17, 1939

2,143,841

UNITED STATES PATENT OFFICE 2,143,841

APPARATUS FOR HEATING LIQUID

James Thomas Byrne, New York, N. Y.

Application June 19, 1935, Serial No. 27,310

2 Claims. (Cl. 122—156)

This invention relates to a heating apparatus and more particularly to a gas fired boiler and heating means therefor, having special utility in domestic heating installations.

Gas fired boilers hitherto used, particularly for domestic hot water supply or house heating, are provided with comparatively large fuel combustion chambers associated with comparatively spacious water drums, requiring a high rate of fuel combustion for heating with attendant costly operation.

The present invention contemplates the provision of a gas fired heater which comprises an elongated comparatively narrow water drum through which a heating flue having a somewhat smaller diameter extends to thereby dispose a comparatively thin column of water around the flue, which construction requires a low rate of fuel combustion to efficiently and rapidly heat the water.

This invention further contemplates the provision of a heating apparatus in which a high circulation velocity is obtained by reason of the intensive thermo convection induced in the liquid heated in my novel apparatus and thereby insures a high rate of heating or evaporation, depending on whether the apparatus is used with a hot water or steam installation.

This invention further contemplates the provision of heating means which may be readily applied to existing domestic hot water supply or house heating systems, either steam or hot water, and which heating means may itself be combined in series to provide a novel hot water or steam boiler.

This invention further contemplates the provision of a gas burner unit for such a heating apparatus which is adapted to burn gas at the desired low rate of combustion and which is adversely affected by the draft in the chimney to which my apparatus is connected.

My invention further contemplates the provision of simple compact apparatus of the above described character which is relatively inexpensive to manufacture and to install and which may be readily assembled.

The various objects of my invention will be clear from the description which follows and from the drawing in which Figure 1 is a side elevation of an illustrative embodiment of my invention attached to a water supply storage tank.

Figure 2 is an enlarged section of the gas burner attached to the heating means shown in Figure 1.

Figure 3 is a partial sectional elevation of a modification of my invention.

Figure 4 is a diagrammatic elevational view of a plurality of my heating units combined in series to heat a water supply storage tank.

In that practical embodiment of my invention which I have illustrated by way of example in Figures 1 and 2, I operatively arrange my novel heating apparatus 10 in the piping system of a domestic hot water supply installation adjacent the hot water storage tank 12.

The lower end of the storage tank 12, is provided with the usual cold water inlet 13 having a union 14 for connecting the tank to the cold water supply piping.

In order to install my heating apparatus in a domestic hot water system to deliver hot water to the storage tank, I secure the side outlet 20 of the T 22 to the cold water inlet union 14, one leg 24 of the T 22 receiving the cold water supply pipe 16 and the other leg 26 receiving the heating apparatus inlet leg 18.

The upper end of the storage tank is similarly provided with the usual hot water outlet 27 having a union 28 which is secured to the side outlet 30 of the T 32.

The hot water supply pipe 36, through which the hot water is drawn from the tank for circulation through the hot water risers, enters the outlet 34 of the T 32, the other outlet 38 of which receives the heating apparatus hot water outlet 40.

It will be understood, that while I have shown a vertical storage tank which may be supported as on the cradle 42 having the tripod base 44; my heating unit may be connected to any other type of hot water storage tank or similar apparatus and that the means of connecting my unit thereto, as heretofore described, is illustrative only and may be varied in accordance with good practice or with the piping system in which it is to be installed.

It will be apparent that I have illustrated a complete water circulating system in which cold water is supplied to the tank and the heating apparatus by means of the supply pipe 16 and withdrawn from the tank and the heating apparatus through the circulating pipe 36.

It will be further apparent that heating of the water will induce it to circulate by convection from the storage tank through the cold water T 22 and inlet leg 18 to the heater and therefrom through the hot water T 32 and outlet leg 40 back to the tank, as will be more fully explained below.

In order to provide means for heating the water in my novel heating apparatus, I provide an elongated flue pipe 46, which may be made of brass, copper or other suitable metal and as thin as strength requirements will permit, and which has a preferable inside diameter of approximately 1¼ inches. The flue pipe 46 is received by the upturned cupped flange 48 and may be secured thereto by set screws 50 arranged on the upturned flange walls 52 which frictionally engage the lower end 54 of the flue pipe to thereby effect a tight connection.

An internal gas pipe 56, extending into the flue pipe 46 and which is externally threaded at its lower end 57, is screwed into the internally threaded opening 58, centrally arranged in the cupped flange 48, to thereby operatively connect the gas burner assembly to and support it on the flue pipe.

In order to provide means for adjusting the proportions of combustible gas and air supplied to the burner, and a mixing chamber therefor, the threaded outlet 60 of the gas T 62 is arranged on the internal gas pipe 56 extending from the cupped flange 48 and communicates with the flexible gas supply pipe 64, and the side outlet 65 receives the air supply pipe 66.

A gas cock 68, having a handle 70 for regulating the quantity of gas supplied to the burner, is arranged between the gas supply line 64 and the gas burner elbow union 72. The externally threaded gas orifice support pipe 74 establishes communication between the upper outlet 76 of the elbow 72 and the outlet 82 of the gas T 62. The gas orifices 78, formed from elongated tubes having internal diameters of approximately $\frac{1}{32}$ inch, are arranged in the communicating pipe 74 and extend into the body 84 of the gas burner T, which serves as an air and gas mixing chamber.

The number of orifices supplied may be varied as desired, in accordance with the rate of fuel combustion sought. I have found that one such orifice is sufficient to heat a small storage tank, such as one having a capacity of 65 gallons, but due to the fact that the ordinary commercial gas meters are not sufficiently sensitive to record such low gas consumption, a burner having at least three such orifices is required in practice.

The side outlet 65 of the T 62 receives the air supply pipe 66 which has arranged thereon a suitable valve 88 through which the supply of air may be regulated by adjustment of the valve stem and handle 90.

The burner assembly may be released from the flue pipe by withdrawing the set screws securing it thereto, the flexible gas pipe permitting the entire gas burner unit to be withdrawn from the heating apparatus so that the gas may be ignited.

The proper air and gas mixture may be obtained by adjusting the air valve 88 and the gas cock 68 to obtain the fuel combustion desired. After igniting the gas burner, it is returned into the flue pipe and secured thereto in the manner described above.

I have found that the efficiency of my unit is greatly increased by causing the gas flame to impinge directly against the flue pipe and direct the gases against the surface thereof and in order to accomplish this purpose, I arrange the hollow flame spreader cylinder 92 in the flue pipe telescoping the internal pipe 56 and extending thereabove a comparatively short distance. This internal cylinder causes the flame issuing from the gas burner to spread out, to thereby impinge against the flue pipe.

In order to provide means for the admission of secondary air I circumferentially arrange a plurality of apertures 94 in the base 96 of the cup flange 48. Secondary air is at all times drawn into the burner through this aperture by the natural chimney draft induced in the flue pipe, and relieves the burning flame of the intensive suction which the chimney sets up, thereby eliminating possibility of the flame being blown out.

As the fuel is burned the hot gases of combustion impinge against the flue pipe 46 and are drawn up therethrough by the draft induced in the chimney, to which the flue pipe is connected in the usual manner, to thereby heat the comparatively thin column of water 98 which completely encloses the flue pipe.

My novel heating apparatus may be assembled from the usual piping and fittings, commonly found in practice. The heating apparatus 10 is provided with an inlet header by the reducing T 100, through which the lower end 102 of the flue pipe extends into the cupped flange 48. The reducing side outlet 104 is suitably dimensioned to receive the cold water inlet leg 18. The outer water retaining drum 106 is threaded at its lower end 107 and is received by the upper outlet 108 of the lower T 100 and supported thereby.

In order to close the inlet header end and to make it water tight, I secure a gasket 110 between the lower T face 112 and the flange 114 which may be threaded to the flue pipe 46 or secured against the T face 112 as by means of the bolt and nut assemblies 116, to thereby provide an inexpensive stuffing box. Adjacent the upper end 118 of the flue pipe, I arrange the hot water outlet header T 120, through which the flue pipe extends toward the chimney to which it is secured, the side outlet 122 receiving the hot water outlet leg 40. The water retaining pipe 106 is threadedly secured at its upper end 124 to the lower outlet 126 of the upper T 120.

I close the hot water outlet header 120 and provide a water tight end in the same manner as heretofore described for the heating apparatus water inlet header end, by providing a suitable flange 128, secured to the T face 130 in the usual manner and with a water tight gasket therebetween.

The upper end 118 of the flue pipe is operatively connected in the usual manner to a chimney to thereby provide the disposal of the heated products of combustion after they pass through my novel heating apparatus.

In that practical embodiment of my invention which I have constructed and which is illustrated in Figures 1 and 2, the inner flue pipe is provided with a nominal inside diameter of 1⅝ inches. In order to present a comparatively thin ribbonlike column of water to the intense heating of the flue gases, I telescopically arrange around the heating flue the outer water retaining pipe having a nominal inside diameter of 2 inches, and an approximate length of 3 to 6 feet, whereby a film of water approximately $\frac{3}{16}$ of an inch in width is disposed around the heated flue pipe.

It will be apparent that the thin ribbonlike column of water will quickly absorb heat from the gases of combustion as they are circulated through the inner flue pipe and to which the water is subjected throughout the length of the water drum.

The rate of heat transfer from one medium to another is dependent, among other things, upon the area of the heat transfer surface presented by the cold medium to the heated medium. It will be seen that my novel heating apparatus disposes an exceptionally large area of heating surface for a comparatively small volume of water to the heating action of the flue pipe, thereby subjecting the water in comparatively small quantities to an intense heat, which rapidly raises the temperature thereof.

Because of this rapid rise in temperature and the extremely small volume of heated water in the heating apparatus drum compared to the volume of colder water in the remainder of the system, a high velocity of water circulation is induced in the system by convection, the heated water rising along the flue pipe in the same direction of travel as the gases of combustion circulated therethrough.

As the hot water rises by convection in the drum it circulates through the upper header T 120 and the communicating outlet leg 40 into the storage tank through the T 32 to displace cold water, which circulates through the T 22 and the communicating leg 18 into the lower header T 100 and the heating apparatus where it is in turn heated.

The comparatively rapid rate of heat transfer to the thin ribbonlike film of water surrounding the heating flue and resulting rapid water circulation induced thereby permits a comparatively large tank of water to be heated while burning the fuel at an extremely low rate of combustion. In a practical embodiment of my invention which I constructed, the combustion of approximately 8 cubic feet per hour of artificial gas was required to heat a 65 gallon storage tank installed in domestic hot water supply system.

It will be understood that the actual dimensions which are given above may be varied within the usual latitudes permitted in actual practice without departing from the gist and essence of the present invention.

It will also be understood that fuels other than gas, such as coal, or oil, may be used, or heat generated by means of electrical current may be supplied.

Referring now to Figure 3 I have shown herein a modification of the heating apparatus disclosed in Figures 1 and 2. An elongated integral drum 130 which may be made from cast iron or other suitable metal is provided with a cold water inlet 132 adjacent the lower end of the drum and which receives the cold water leg 18. A hot water outlet 134 for communication with the hot water leg 40 is provided adjacent the upper end of the drum.

In order to increase the flue pipe heating surface presented to the water 98 a corrugated flue pipe 135 may, if desired, be arranged in the elongated drum 130. The ridges and furrows of such construction present 20% to 40% more pipe heating surface area to the water than a straight flue, with correspondingly increased heat transfer efficiency.

Secured to the lower flange 136 of the integral drum, as by means of the bolt and nut assemblies 138, I provide a flange union 140 having a depending burner enclosing pipe 142 which may be secured to the burner in the manner heretofore described.

In order to provide a water tight joint, the lower end of the heating flue pipe may be bent upwardly against the drum flange 136 and a water tight gasket 144 secured between the flanges 140 and 136. The upper end of the drum may be similarly arranged to provide a water tight connection between the drum and the flue chimney connecting joint 146.

It will be understood that my novel heating unit may be attached to any heating systems such as existing hot water or steam boilers or a plurality of my novel heating apparatus units may be combined in series to provide a house heating boiler of either the hot water or steam type. In those constructions in which my novel units are combined to provide a steam boiler a suitable steam header may be connected to the upper header T's to thereby provide a steam chest which is connected to the house risers and returns in the usual manner.

In Figure 4 I have illustrated a plurality of my novel heaters combined to heat water for supply to an apartment house. For service of this type large capacity tanks varying from 300 gallons to 3,000 gallons capacity are used to store the hot water from which it is drawn by the user.

To heat such large hot water tanks with gas fuel is very costly and such installations have therefore been limited to coal or fuel oil burning boilers, which have a comparatively low heating rate.

In an apartment building, housing ten to a hundred families, large capacity tanks are required due to the time lag in heating the storaged water with boilers of the type hitherto used.

Due to the comparatively high velocity circulation induced in my heater and corresponding rapid rate of water heating, much smaller storage tanks may be used for apartment house water supply.

In such an installation I provide a plurality of my heaters 148 which are connected in series by means of the circulating pipes 150, the number varying with capacity desired.

The cold water supply pipe 152 is connected, in the usual manner, to the storage tank 154, which need be only of a capacity of approximately 165 gallons, and to the first heater of the series 148. The last heater 156 is similarly connected to the storage tank hot water inlet 158 and the hot water supply circulating line 160.

A suitable thermostat 162 operating a valve 164 in the heater series hot water outlet line 166 may be inserted, if desired in the storage tank. Combustion of fuel in the heaters may be regulated by suitable thermostatically controlled gas valves, having automatic heater gas igniting pilot lights attached thereto.

When the water in the tank drops to a predetermined selected temperature, the thermostat automatically opens the valve 164 thereby permitting circulation of water through the tank and heaters and simultaneously operating the heater gas burners, whereby the water in the tank is heated.

When the water in the tank reaches a predetermined temperature, for example 200° F. the thermostat automatically closes the valve 164 and shuts off the fuel supply to the heaters.

As water is drawn by the occupants of the apartment house through the circulating pipe 160, cold water enters the tank through the supply pipe 152 thereby reducing the temperature in the tank, thereby operating the heaters as described above.

It will be apparent, that water entering the first of the heaters will be rapidly heated and circulated into succeeding heater which will further raise the temperature of the water, each succeeding heater acting as a booster.

Extremely rapid circulation is induced in the system with a corresponding high rate of water heating so that only a comparatively small storage tank is required to satisfy the hot water requirements of a large apartment house.

It will, therefore, be seen that I have disclosed a heater which insures a high rate of heating or evaporation of water or any other fluid, circulation of which through the heater is rapidly induced, and which heater may be readily applied to existing heating installations.

It will be further seen, that my novel heater is economical in operation, burns fuel at extremely low rates of combustion, provides an efficient heat transfer unit and is inexpensive to manufacture and install.

While I have shown specific embodiments of my invention it will be understood that such disclosure is merely illustrative of my invention and that other modifications, apparent to those skilled in the art, may be made thereto and that I intend to claim my invention as broadly as permissible and limited only by the prior art and the scope of the appended claims.

I claim:

1. In a heater, an outer water drum, a concentric flue pipe extending therethrough and secured at one end thereof to a perforated cup flange for admitting air therethrough, said drum and pipe forming an intermediate concentric compartment for retaining a heatable circulatory fluid therein, fuel burning means in connection with the cup flange, and a concentric cylinder mounted on the flange within the flue pipe forming an intermediate space with the pipe for spreading the flame emanating from the fuel burning means against the wall of flue pipe.

2. A heating device for water and the like, comprising an elongated tubular member adapted for connection at opposed ends with a source of circulatory fluid, a coaxial flue chamber extending through the member and forming an intermediate compartment for water and the like, said flue chamber having its walls angularly corrugated with respect to the axis thereof, a cupped member closing one end of the compartment and having a plurality of air apertures therein, a gas pipe member arranged concentrically in the member communicating with the flue chamber and extending partly thereinto, a spaced cylinder surrounding the gas pipe member intermediate the pipe and wall of the flue chamber and extending a short distance above the pipe, and gas combustion means leading into the pipe member whereby the flame coming from said means is projected upwardly through the pipe member and the cylinder and spread out directly against the wall of the flue chamber for heating the fluid in the intermediate compartment.

JAMES THOMAS BYRNE.